Dec. 24, 1946.   R. E. DUNNEBECK   2,412,975
PISTON AND CYLINDER ASSEMBLY
Filed Feb. 18, 1944
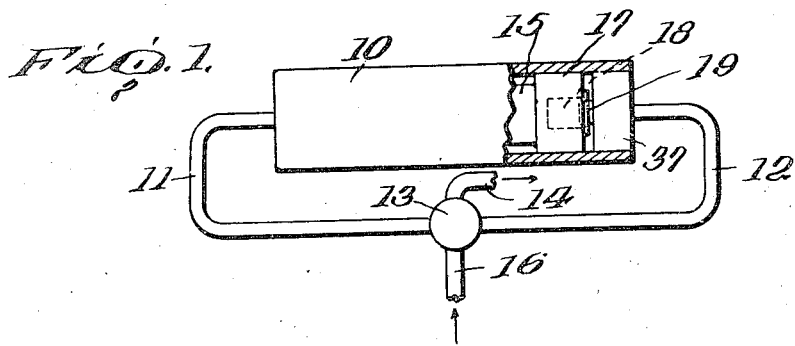
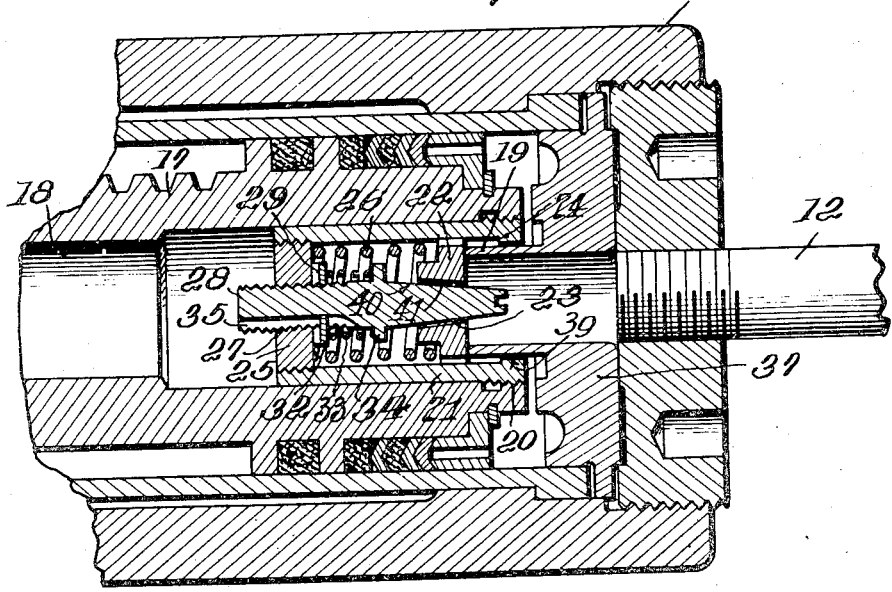
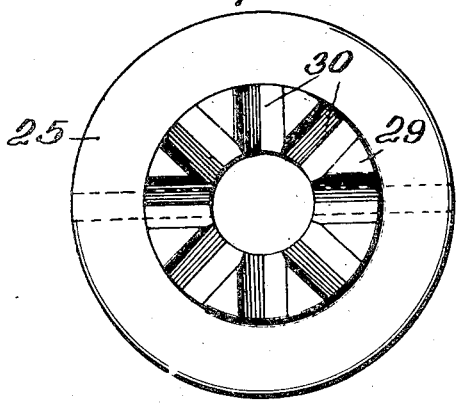
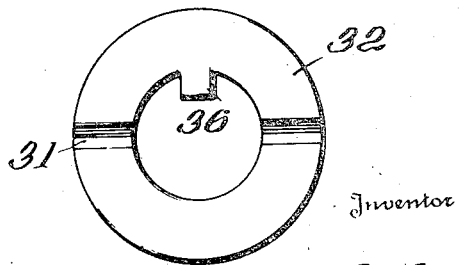
Inventor
Robert E. Dunnebeck.

Patented Dec. 24, 1946

2,412,975

UNITED STATES PATENT OFFICE 2,412,975

PISTON AND CYLINDER ASSEMBLY

Robert E. Dunnebeck, Cleveland, Ohio, assignor to The Parker Appliance Company, Cleveland, Ohio, a corporation of Ohio Application February 18, 1944, Serial No. 522,961

11 Claims. (Cl. 121—38)

The invention relates generally to piston and cylinder assemblies, and seeks to provide certain new and useful improvements in means for providing a cushioning action in such assemblies at the limits of relative movement between the piston and cylinder elements.

A piston and cylinder assembly sometimes is employed in a closed fluid pressure system wherein the fluid under pressure is used for moving the piston which, in turn, is connected by any suitable take-off to the device or mechanism to be operated or controlled thereby. It is obvious that such an assembly has general utility and can be employed in a wide variety of fields. Thus, such an assembly may be conveniently employed for various hydraulic steering installations, for operating turret mechanisms and flight control devices on airplanes, and for many other uses. In other uses, the piston and cylinder assembly may merely be operatively connected with an operated device so as to act as a shock absorbing means.

Where the device which is to be operated by action of the piston and cylinder assembly, or which is merely operatively connected with said assembly as aforesaid, develops considerable inertia during movement thereof, it is important to prevent jarring at the limits of its path of travel so as to guard against damage thereto. It is a purpose of the present invention to provide novel means for preventing this jarring by checking or cushioning movement of the piston near the end of its stroke by causing fluid in the cylinder to exhaust through a restricted passage as the piston nears the end of its stroke.

An object of the present invention is to provide a piston and cylinder assembly having novel cushioning means of the character stated adapted for efficient use in systems employing an operating fluid of low viscosity.

Another object of the invention is to provide an assembly of the above type wherein the restricted fluid escape passage is formed between surfaces which are adjustable as to spaced relation to compensate for wear, differences in fluid viscosity, and the like.

A further object of the invention is to provide an assembly of the above type wherein the fluid escape passage is formed between relatively movable surfaces which are shaped to provide a passage which progressively varies in fluid passing capacity as the relative movement between piston and cylinder progresses at the portion of the piston stroke to be cushioned and which also is adjustable so as to enable variation of the extent of cushioning.

A still further object of the invention is to provide an assembly of the above type wherein the cushioning device is in the form of a unitary assembly adapted to be installed as such.

The above and other objects of the invention will in part be obvious and will be hereinafter more fully pointed out.

In the accompanying drawing:

Figure 1 is a diagrammatic view showing a fluid pressure system including a piston and cylinder assembly.

Figure 2 is an enlarged longitudinal sectional view through one end of the assembly showing the position of the parts with the piston at or near the end of its stroke.

Figure 3 is a plan view of the indexing washer.

Figure 4 is a plan view of the retaining screw.

Before describing the details of construction of the cushioning means, reference is made to the diagrammatic showing of Figure 1 for a typical fluid pressure installation. The ends of the cylinder 10 are connected to conduits 11, 12 which lead to a housing 13 within which a suitable control valve is mounted. Such a control valve is of the type which operates to selectively direct fluid under pressure from the supply line 16 to either of the conduits 11, 12. As shown, the fluid under pressure has been passed through the conduit 11 so as to force the piston 15 toward the opposite end of the cylinder, and the control valve operates in this instance to connect the conduit 12 with the exhaust 14 or low pressure side of the source of supply. In this particular installation, a double headed piston is employed, although only one head 17 is shown. However, the cushioning device may also be employed with a single headed piston when so desired. The cushioning mechanism will be hereinafter fully described, but is adapted to be mounted in a recess 18 in the pinion head 17 for cooperation with a sleeve 19 extending inwardly from the adjacent end of the cylinder 10. Thus, movement of the piston is retarded or cushioned at the end of its stroke and the same mechanism may be embodied in the opposite end of the piston and cylinder so as to prevent jarring of the device which is operated by movement of the piston or is otherwise operatively connected therewith. Any suitable type of take-off may be employed for transmitting movements of the piston to the device to be operated or controlled thereby, or the piston may be operatively connected in any approved manner with some movable element the movement of which is to be cushioned at some travel limit.

The cushioning means will now be described, reference being had to Figures 2, 3 and 4 of the accompanying drawing. The end of the piston head is internally threaded, as at 20, and is adapted to receive the externally threaded outer end of a sleeve member 21 in the form of a bushing which fits into the recess 18. A hexagonal slide member 22 is slidably mounted and guided within the sleeve member 21 and is provided with a tapered bore 23 of gradually increasing diameter inwardly of the piston. At the outer end of the sleeve member 21, there is provided an inward shoulder 24 effective to limit outward movement of the slide member 22. The opposite or inner end of the sleeve member 21 is internally threaded to receive a retaining screw 25. A coil spring 26 is disposed within the sleeve member and bears against the retaining screw 25 and the slide member 22 so that the latter is normally urged outwardly against the shoulder 24. However, when the piston nears the end of its stroke, the hexagonal slide member 22 is engaged by the end of the sleeve 19 and is forced inwardly against the action of the spring 26 to form a fluid seal, that is, to separate the fluid trapping space surrounding the sleeve 19 from the interior of said sleeve and cause the trapped fluid to pass about the periphery of the slide member 22 into the interior of the sleeve member 21.

The retaining screw 25 is provided with a central threaded opening 27 through which a screw 28 is adjustably threaded. The outer end of the screw 28 extends in spaced relation through the bore 23 of the hexagonal slide member 22 and is correspondingly tapered. The retaining screw 25 is provided with an annular boss portion 29 on its inner face, and the boss is provided with a plurality of V-shaped radial notches 30 into which projections 31 on an indexing washer 32 are adapted to fit. The indexing washer is pressed against the boss by a coil spring 33 which bears against the washer and against an annular shoulder 34 on the screw 28. The screw 28 is provided with a longitudinal slot 35 along the threaded portion thereof, and the washer 32 has an inwardly extending projection 36 fitting within the slot 35 so that the screw and the washer must rotate in unison. The washer and boss thus serve to yieldingly maintain the screw 28 in any predetermined set position. The clicking or snapping of the projections 31 on the washer 32 into the notches 30 will give an indication of the amount of turning of the screw 28, and knowing the thread pitch on the screw 28 and the location and number of the notches 30, the exact amount of adjustment of the size of the passage can be determined. It will be seen that the entire cushioning mechanism can be assembled as a unit and then secured in the end of the piston.

In operation, as the piston moves toward one end of the cylinder, a certain amount of fluid will be trapped within the sleeve member 21 and the piston and also between the end of the piston and the cylinder head 37. The fluid will be forced into the interior of the sleeve member 21 through the restricted annular passage 39 (see Figure 2) between the outer surface of the sleeve 19 and the inner adjacent surface of the sleeve member 21 as these sleeves assume telescoping positions near the end of the piston stroke. The end of the sleeve 19 engages the outer face of the slide member 22 and acts as a valve forming a seal therewith so that the fluid must then pass about the periphery of the slide member 22 into the interior of the sleeve member 21. In order to reach the conduit 12 which is now the exhaust, the fluid must pass through the passage 41 formed between the tapered surface 40 on the screw 28 and the tapered surface of the bore 23 through the slide member 22. After initial contact between the sleeve 19 and the slide 22, further movement of the piston toward the end of the cylinder will cause inward movement of the slide 22 so that the passage between the screw 28 and the slide member 22 is gradually reduced in fluid passing capacity. This results in the offering of increased resistance to the escape of fluid from the end of the cylinder and the interior of the sleeve member 21 so as to produce the desired cushioning effect as the piston approaches the end of its stroke.

The particular type of installation will determine the required degree of cushioning, and to this end the screw 28 is readily accessible for rotary adjustment to any desired position. Thus, by adjusting the screw 28 inwardly, the degree of cushioning will be reduced as the slide member 22 will have to travel farther to reduce the passage 41 to a predetermined size. Conversely, shifting the screw outwardly will produce greater cushioning effects. If uneven wear should occur between the slide member and the adjusting screw, such a condition would alter the cushioning effect for any given predetermined set position of the adjusting screw. However, the condition can be immediately remedied by merely changing the position of the adjusting screw.

It is normally preferable that the screw 28 be so adjusted that the passage through the bore 23 will be very nearly closed when the piston head abuts the cylinder head 37 at the end of the stroke. Otherwise, if said passage 23 would be closed entirely before the piston reached its maximum travel position, the slide member 22 might jam on the tapered surface 40 of the screw 28.

When used in conjunction with a double ended piston and it is desired to return the piston to the opposite side of the cylinder than shown in Figure 1, the valve 13 is turned to direct fluid under pressure from conduit 16 into conduit 12. In this position, conduit 11 will then be connected with the exhaust conduit 14.

The pressure fluid entering through conduit 12 passes through the interior of cylinder head 37, through the bore 23 and into the interior of the sleeve member 21. It then passes about the periphery of slide member 22, through the annular passage 39 and into the space between the piston head 17 and the cylinder head 37.

As the pressure fluid starts to move the piston to the opposite side of the cylinder, the shoulder 24 of the sleeve member 21 reaches the end of the sleeve 19. At this point, the shoulder 24 will abut the slide member 22 and carry it away from the sleeve 19, thus breaking the seal between the two parts and allowing the pressure fluid to have direct access to the entire piston area without first passing through the restricted bore passage 23. Continued movement of the piston will cause the sleeve member 21 to disengage from its telescoping relation with the sleeve 19.

While one form of the invention has been shown for purposes of illustration, it is to be clearly understood that various changes in the details of construction and arrangement of parts may be made without departing from the scope of the invention as set forth in the appended claims.

Having thus described the invention, what is claimed as new and desired to be secured by Letters Patent is:

1. In apparatus of the character described, relitively movable cylinder and piston elements, and means carried by one said element for controlling passage of fluid trapped in the cylinder element near a limit of relative movement between the said elements for cushioning the relative movement of said elements during the approach to said limit, said means including a slide member with a bore therethrough and an adjustably mounted screw extending into said bore and cooperating therewith in forming a restricted fluid passage about said screw, adjustment of the position of the screw in said bore serving to vary the size of said passage.

2. In apparatus of the character described, relatively movable cylinder and piston elements, and means carried by one said element for controlling passage of fluid trapped in the cylinder element near a limit of relative movement between the said elements for cushioning the relative movement of said elements during the approach to said limit, said means including a slide member having a tapered bore therethrough, and a tapered screw extending into said bore and cooperating therewith in forming a restricted fluid passage about said screw, said screw being movable relative to said bore and along the longitudinal axis thereof during relative movement of said piston and cylinder elements near said limit of movement thereby to gradually vary the size of said passage.

3. In apparatus of the character described, relatively movable cylinder and piston elements, and means for controlling passage of fluid trapped in the cylinder element near a limit of relative movement between the said elements for cushioning the relative movement of said elements during the approach to said limit, said means including a member carried by and movable with respect to one of said elements near said limit of relative movement and having a bore therethrough, and a tapered member carried by said one element extending into said bore to form therewith a restricted fluid passage which is reducible in size by movement of the said bore equipped member relative to said tapered member, and means for causing said bore equipped member to move relative to said tapered member during the approach to said limit, thereby to increase resistance to continued relative movement between the piston and cylinder elements.

4. In apparatus of the character described, relatively movable cylinder and piston elements, a pair of members carried by one of said elements in spaced relation and movable toward one another and shaped to cooperate in providing a restricted passage having a greater or lesser fluid passing capacity accordingly as said members are spaced apart a greater or lesser degree and through which fluid trapped in the cylinder element must pass as said elements move toward a limit of their relative movement, means engageable with one of said members as said elements approach said limit of relative movement therebetween to gradually reduce the spacing between said members and provide relative movement cushioning effect gradually increasing in intensity as said limit is approached, means for adjusting the fluid passing capacity of the passage formed between said members, and means normally urging said movable members to a position wherein the fluid passage assumes maximum size.

5. In apparatus of the character described, relatively movable cylinder and piston elements, a pair of members carried by one of said elements in spaced relation and movable toward one another and shaped to cooperate in providing a restricted passage having a greater or lesser fluid passing capacity accordingly as said members are spaced apart a greater or lesser degree and through which fluid trapped in the cylinder element must pass as said elements move toward a limit of their relative movement, means engageable with one of said members as said elements approach said limit of relative movement therebetween to gradually reduce the spacing between said members and provide relative movement cushioning effect gradually increasing in intensity as said limit is approached, means normally tending to separate said pair of members, one of said pair of members comprising a slide having a bore therethrough, and the other of said pair of members comprising a tapered body projecting into said bore, and means for adjusting the normal spaced relation of said slide and tapered body to vary the normal size of the restricted passage therebetween.

6. In apparatus of the character described comprising relatively movable cylinder and piston elements, a sleeve secured to said piston element, a slide member mounted in said sleeve and having a tapered bore therethrough, a tapered screw adjustably carried by said sleeve and extending through said bore to provide a restricted and variable fluid passage through which fluid trapped in the cylinder as the piston and cylinder approach a limit of relative movement must pass, and means on said cylinder element engageable with said slide as the piston and cylinder elements approach a limit of relative movement therebetween for shifting said slide, thereby to cause a greater projection of the screw into said bore and a corresponding reduction in the size of said fluid passage.

7. A device of the character described comprising cylinder and piston elements, a sleeve carried by said piston, stationary and movable telescoping members mounted in said sleeve and having similarly tapered cooperating surfaces forming a restricted and variable fluid passage leading out of said sleeve, spring means normally urging said movable telescoping member outwardly, and an inwardly projecting collar in the cylinder element adapted to extend into said sleeve as the piston and cylinder elements approach a limit of relative movement to form therewith a restricted fluid passage through which fluid trapped between the cylinder and piston must pass into said sleeve as the piston and cylinder elements approach said limit of relative movement and to engage the movable telescoping member in fluid sealing contact and force the same inwardly whereby to increase the cushioning effects by reducing the size of said fluid passage through which the trapped fluid is expelled from the interior of said sleeve.

8. Apparatus as defined in claim 7 in which the stationary telescoping member comprises a tapered plunger, and the movable telescoping member includes a correspondingly tapered bore, and means is provided for adjusting the position of the plunger in the bore to vary the normal size of the restricted fluid passage.

9. A device adapted for incorporation as a unit in a cylinder and piston assembly for cushioning relative movement between the cylinder and piston elements, comprising a sleeve adapted to be secured to the piston element, relatively slidable members carried within said sleeve and having similarly tapered adjacent surfaces forming a restricted and variable fluid passage therebetween, spring means normally tending to maintain said members in a position wherein the passage is of maximum size, and means for adjusting the predetermined relative positions of said members whereby to control and alter the cushioning effect as desired.

10. A device adapted for use in a cylinder and piston assembly for cushioning relative movement between the piston and cylinder elements, comprising a sleeve adapted to be secured to the piston element and having inwardly extending shoulder means at one end thereof, a slide member guided within the sleeve and having a tapered bore therethrough, a similarly tapered screw carried by the sleeve and extending into said bore to form a restricted fluid passage and being adjustable on rotation to vary the size of the passage and resultant cushioning effect, and spring means normally forcing said slide into engagement with said shoulder means, said slide member being adapted to contact a part of said cylinder element and to be moved inwardly thereby as the piston and cylinder elements approach the limit of relative movement therebetween whereby to reduce the size of the escape passage and increase the cushioning effect.

11. Apparatus of the character described wherein are included an exhaust passage and relatively movable piston and cylinder elements and means carried by one said element for restricting exhaust of fluid through said passage near a limit of relative movement between said elements for cushioning said relative movement during the approach to said limit, said means including a slide member carried by one of said elements and adapted to be contacted with by the other of said elements for closing the exhaust passage immediately upon said contact and for arresting movement of said slide member relative to said other element, said slide member defining with said first named element a restricted by-pass passage communicating with the exhaust passage and constituting the sole exhaust means upon further relative movement of the elements subsequent to the aforesaid contact, said restricted by-pass passage being arranged so that relative movement between the slide member and said first named element is effective to gradually reduce the size of said restricted by-pass passage as the elements approach the limit of their relative movement.

ROBERT E. DUNNEBECK.